(12) United States Patent
Sawada et al.

(10) Patent No.: US 10,943,141 B2
(45) Date of Patent: Mar. 9, 2021

(54) OBJECT DETECTION DEVICE AND OBJECT DETECTION METHOD

(71) Applicant: Mitsubishi Electric Corporation, Tokyo (JP)

(72) Inventors: Tomoya Sawada, Tokyo (JP); Hidetoshi Mishima, Tokyo (JP); Hideaki Maehara, Tokyo (JP); Yoshimi Moriya, Tokyo (JP); Kazuyuki Miyazawa, Tokyo (JP); Akira Minezawa, Tokyo (JP); Momoyo Hino, Tokyo (JP); Mengxiong Wang, Tokyo (JP); Naohiro Shibuya, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 136 days.

(21) Appl. No.: 16/329,146

(22) PCT Filed: Sep. 15, 2016

(86) PCT No.: PCT/JP2016/077268
§ 371 (c)(1),
(2) Date: Feb. 27, 2019

(87) PCT Pub. No.: WO2018/051459
PCT Pub. Date: Mar. 22, 2018

(65) Prior Publication Data
US 2019/0197345 A1 Jun. 27, 2019

(51) Int. Cl.
*G06K 9/46* (2006.01)
*G06T 7/215* (2017.01)
(Continued)

(52) U.S. Cl.
CPC ....... *G06K 9/4676* (2013.01); *G06K 9/00805* (2013.01); *G06K 9/4609* (2013.01);
(Continued)

(58) Field of Classification Search
CPC ............. G06K 9/4676; G06K 9/00805; G06K 9/4609; G06T 7/215; G06T 7/10; G06T 7/00; G06T 7/20
See application file for complete search history.

(56) References Cited

U.S. PATENT DOCUMENTS 9,025,880 B2 * 5/2015 Perazzi ................ G06K 9/4671
382/190
2005/0169529 A1 * 8/2005 Owechko ............... G06K 9/469
382/190

(Continued)

FOREIGN PATENT DOCUMENTS

JP 2006-047091 A 2/2006
JP 2007-069488 A 3/2007

(Continued)

OTHER PUBLICATIONS

Zhang, Libao "Region-of-Interest Extraction Based on Frequency Domain Analysis and Salient Region Detection for Remote Sensing Image" IEEE Geoscience and Remote Sensing Letters. vol. 11 No. 5 (Year: 2014).*

(Continued)

*Primary Examiner* — Kim Y Vu
*Assistant Examiner* — Molly Delaney
(74) *Attorney, Agent, or Firm* — Birch, Stewart, Kolasch & Birch, LLP

(57) ABSTRACT

An image feature map generating unit (3) generates, on the basis of feature amounts extracted from a plurality of images successively captured by a camera (109), an image feature map which is an estimated distribution of the object likeli- (Continued)

hood on each of the images. An object detecting unit (4) detects an object on the basis of the image feature map generated by the image feature map generating unit (3).

5 Claims, 9 Drawing Sheets

(51) Int. Cl.
*G06T 7/10* (2017.01)
*G06T 7/00* (2017.01)
*G06T 7/20* (2017.01)
*G06K 9/00* (2006.01)

(52) U.S. Cl.
CPC .................. *G06T 7/00* (2013.01); *G06T 7/10* (2017.01); *G06T 7/20* (2013.01); *G06T 7/215* (2017.01)

(56) References Cited

U.S. PATENT DOCUMENTS

| | | |
|---|---|---|
| 2009/0169908 A1 | 7/2009 | Ueda |
| 2011/0026766 A1 | 2/2011 | Eshima |
| 2013/0215270 A1 | 8/2013 | Murashita et al. |
| 2015/0071543 A1 | 3/2015 | Oka |
| 2016/0086050 A1* | 3/2016 | Piekniewski ............ G06K 9/48 382/103 |
| 2017/0300788 A1* | 10/2017 | Cao ....................... G06K 9/6267 |

FOREIGN PATENT DOCUMENTS

| | | |
|---|---|---|
| JP | 2007-334859 A | 12/2007 |
| JP | 2009-146153 A | 7/2009 |
| JP | 2009-229085 A | 10/2009 |
| JP | 2011-028689 A | 2/2011 |
| JP | 2012-003604 A | 1/2012 |
| JP | 2013-105432 A | 5/2013 |
| JP | 2013-168062 A | 8/2013 |
| JP | 2013-205410 A | 10/2013 |
| JP | 2015-056054 A | 3/2015 |

OTHER PUBLICATIONS

Akata et al., "Good Practice in Large-Scale Learning for Image Classification", IEEE Transactions on Pattern Analysis and Machine Intelligence, vol. 36, No. 3, Mar. 2014, pp. 507-520.
Cheng et al., "BING: Binarized Normed Gradients for Objectness Estimation at 300fps", IEEE CVPR, 2014, pp. 1-8.
Hashiguchi et al., "Sensing Technology Supporting Convergence Service", Fujitsu Technical Report, vol. 64, 2013, pp. 74-80.
International Search Report for PCT/JP2016/077268 (PCT/ISA/210) dated Nov. 29, 2016.
Office Action dated May 16, 2017 for Japanese Patent Application No. 2017-510924.
Office Action dated Sep. 12, 2019 issued in corresponding German Patent Application No. 11 2016 007 131.0 with English Translation.

* cited by examiner

OBJECT DETECTION DEVICE AND OBJECT DETECTION METHOD

TECHNICAL FIELD

The present invention relates to an object detection device and an object detection method for detecting an object from a video captured by a camera.

BACKGROUND ART

As a technique for detecting an object from a video captured by a camera, for example, an object detection device described in Patent Literature 1 can be mentioned. In this device optical flows of a screen assumed in a standard environment in which no object is present is generated, also optical flows based on a video actually captured by a camera is generated, and an object is detected on the basis of differences between both.

Note that an optical flow is information in which the amount of movement of the same object associated between successive frame images captured at different times is represented by a vector.

CITATION LIST

Patent Literatures

Patent Literature 1: JP 2007-334859 A

SUMMARY OF INVENTION

Technical Problem

In an optical flow, because the number of pixels of an object in a captured image decreases as the object is located farther from the camera, an absolute value of a vector representing the amount of movement of the object becomes smaller.

Therefore, when an optical flow based on images of an object located far from the camera is used, a difference from an optical flow obtained from an image in which no object is present cannot be obtained accurately, and the object cannot be detected with high accuracy. That is, there is a problem in the object detection device described in Patent Literature 1 that an object located far from the camera cannot be accurately detected.

The invention is to solve the above problem, and it is an object of the present invention to provide an object detection device and an object detection method capable of accurately detecting an object within a range from the vicinity of a camera to a distant location.

Solution to Problem

An object detection device according to the present invention includes a processor to execute a program, and a memory to store the program which, when executed by the processor, performs processes.

In this configuration, the processes includes: acquiring, from a plurality of frame images arranged in a time series in an image sequence successively captured by a camera, a pair of same frame images for each of the plurality of frame images and inverting one of the same frame images, generating image pyramids each of which includes images obtained by gradually reducing a corresponding one of the same frame images of the pair, extracting, from an image of a salient part extracted from each of the images in each of the image pyramids, a group of pixels each of whose pixel value is larger than a corresponding threshold value, the threshold value being set for each of the pixels depending on brightness information in a vicinity of a target pixel, generating a map by integrating the extracted group of pixels, binarizing and then integrating the map generated for each of the images in each of the image pyramids which correspond to the same frame images of the pair, and thereby generating, for each of the plurality of frame images, an image feature map representing an estimated distribution of the object likelihood on a corresponding one of the plurality of frame images; and detecting an object on the basis of the image feature map generated.

Advantageous Effects of Invention

According to the present invention, since an object is detected on the basis of an estimated distribution of object likelihood on an image, an object can be accurately detected within a range from the vicinity of the camera to a distant location, the range being captured by the camera.

DESCRIPTION OF EMBODIMENTS

To describe the present invention further in detail, embodiments for carrying out the invention will be described below with reference to the accompanying drawings.

First Embodiment

Figure 1:
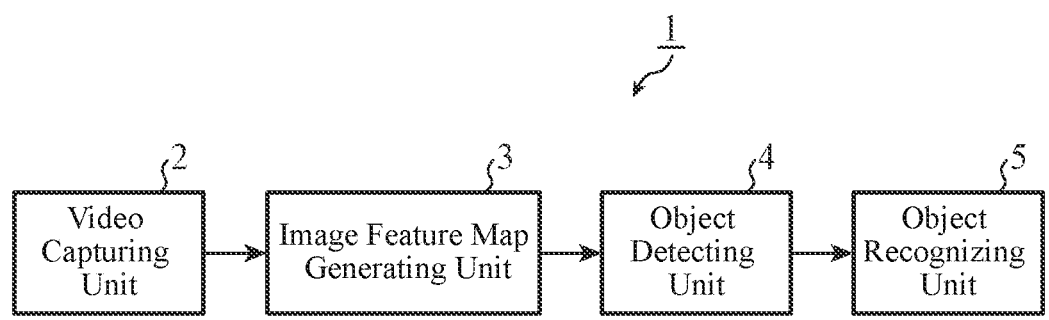
FIG. 1 is a block diagram illustrating a functional configuration of an object detection device according to a first embodiment of the present invention.

FIG. 1 is a block diagram illustrating a functional configuration of an object detection device 1 according to a first embodiment of the present invention. The object detection device 1 detects an object from a video captured by a camera. An object to be detected may be a moving body such as an individual or a vehicle or a stationary object such as a sign.

As illustrated in FIG. 1, the object detection device 1 includes a video capturing unit 2, an image feature map generating unit 3, an object detecting unit 4, and an object recognizing unit 5.

The video capturing unit 2 acquires video data captured by the camera. The video data is an image sequence of a plurality of images successively captured by the camera, and individual images arranged in a time series are frame images.

Note that the camera may be a fixed camera fixedly provided at a predetermined position, or may be a camera mounted on a moving body such as a vehicle.

The image feature map generating unit 3 generates image feature maps on the basis of feature amounts extracted from the video data captured by the camera. An image feature map is a map representing an estimated distribution of object likelihood on an image. The object likelihood means, for example, the degree of being an object or a target of some type.

For example, the image feature map generating unit 3 generates an image pyramid including a plurality of images having different image sizes obtained by gradually reducing a frame image. Subsequently, the image feature map generating unit 3 extracts, from each of the images in the image pyramid, feature amounts of respective image features on the corresponding image, and maps the extracted feature amounts to a two-dimensional coordinate system. This map is an image feature map illustrating an estimated distribution of the object likelihood in the corresponding image.

The object detecting unit 4 detects an object on the basis of the image feature map generated by the image feature map generating unit 3. For example, the object detecting unit 4 detects an object on the image using the image feature map. The object recognizing unit 5 recognizes the object detected by the object detecting unit 4. For example, the object recognizing unit 5 recognizes an attribute of the object on the basis of the shape or the like of the object detected by the object detecting unit 4.

Although in FIG. 1 the case where the object detection device 1 includes the video capturing unit 2 has been described, the video capturing unit 2 may be included in the camera itself.

Moreover, the object recognizing unit 5 may not be included in the object detection device 1 but may be included in an external device connected subsequently to the object detection device 1.

That is, the object detection device 1 is only required to include at least the image feature map generating unit 3 and the object detecting unit 4.

Figure 2:
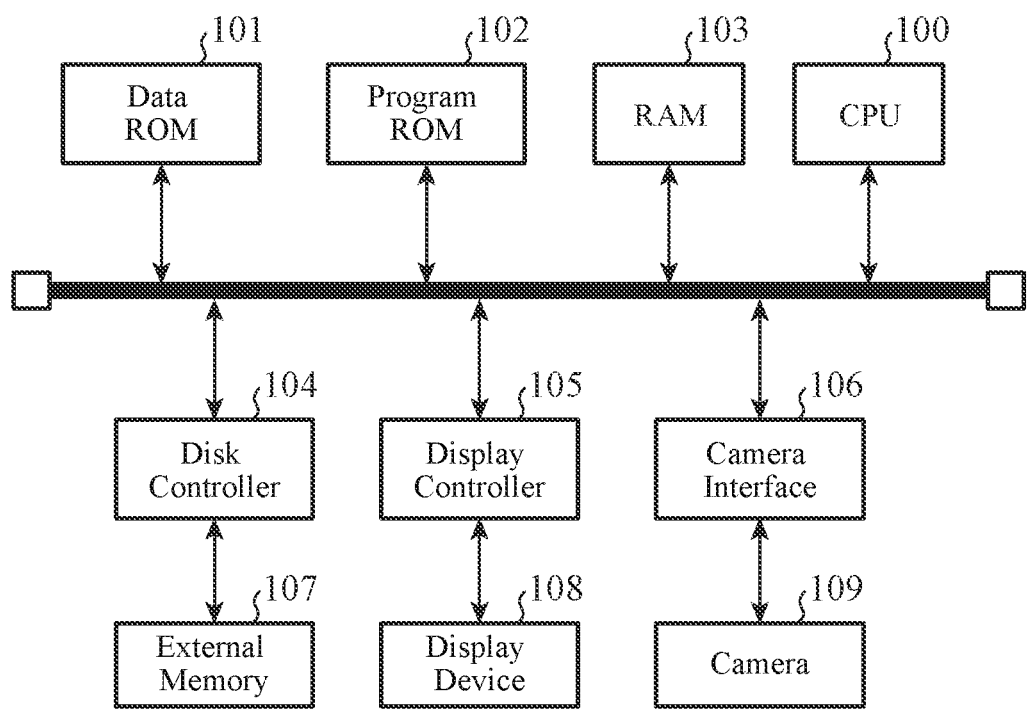
FIG. 2 is a block diagram illustrating a hardware configuration of the object detection device according to the first embodiment.

FIG. 2 is a block diagram illustrating a hardware configuration of the object detection device 1. In FIG. 2, the video capturing unit 2 illustrated in FIG. 1 fetches an image sequence captured by a camera 109 via a camera interface 106 and stores the image sequence in a data read only memory (ROM) 101. The image feature map generating unit 3 illustrated in FIG. 1 generates image feature maps using the image sequence stored in the data ROM 101 and stores the generated image feature maps in a random access memory (RAM) 103.

The object detecting unit 4 illustrated in FIG. 1 detects an object by using an estimated distribution corresponding to each of the plurality of images having different image sizes stored in the RAM 103. The detection result of the object is stored in an external memory 107 via a disk controller 104, or displayed on a display device 108 via a display controller 105.

Moreover, the object recognizing unit 5 illustrated in FIG. 1 recognizes an attribute of the object detected by the object detecting unit 4. An attribute of an object includes, for example, a type such as a vehicle, an individual, or a two-wheeler.

Note that the recognition result of the object is either stored in the external memory 107 via the disk controller 104 or displayed on the display device 108 via the display controller 105.

Note that the disk controller 104, the display controller 105, the camera interface 106, the external memory 107, the display device 108, and the camera 109 may not be included in the object detection device 1. That is, these devices may be provided separately from the object detection device 1, and may be included in an external device capable of receiving and outputting data from and to the object detection device 1.

Note that the functions of the image feature map generating unit 3 and the object detecting unit 4 in the object detection device 1 are implemented by a processing circuit. That is, the object detection device 1 includes a processing circuit for generating image feature maps on the basis of feature amounts extracted from a plurality of images captured successively by the camera and detecting an object on the basis of the image feature maps. The processing circuit may be dedicated hardware or a central processing unit (CPU) 100 that executes a program stored in a program ROM 102.

In the case where the processing circuit is the hardware, the processing circuit corresponds to, for example, a single circuit, a composite circuit, a programmed processor, a parallel programmed processor, an application specific integrated circuit (ASIC), a field-programmable gate array (FPGA), or a combination thereof.

In addition, each of the functions of the image feature map generating unit 3 and the object detecting unit 4 may be implemented by a processing circuit, or the functions may be implemented by a single processing circuit in an integrated manner.

In the case where the processing circuit is the CPU 100, the functions of the image feature map generating unit 3 and the object detecting unit 4 are implemented by software, firmware, or a combination of software and firmware. The software and the firmware are described as programs and stored in the program ROM 102. The CPU 100 reads and executes the programs stored in the program ROM 102 and thereby implements the functions.

That is, the object detection device 1 includes a memory for storing programs which result in, when executed by the processing circuit, execution of the step of generating an image feature map and the step of detecting an object on the basis of the image feature map.

These programs also cause a computer to execute a procedure or a method of each of the image feature map generating unit 3 and the object detecting unit 4. The memory may include, for example, a nonvolatile or volatile semiconductor memory such as a RAM, a ROM, a flash memory, an erasable programmable ROM (EPROM), or an electrically EPROM (EEPROM), a magnetic disc, a flexible disc, an optical disc, a compact disc, a mini disc, or a digital versatile disk (DVD).

Furthermore, some of the functions of the image feature map generating unit 3 and the object detecting unit 4 may be implemented by dedicated hardware, and the other may be implemented by software or firmware.

For example, the function of the image feature map generating unit 3 is implemented by a dedicated hardware processing circuit while the function of the object detecting unit 4 is implemented by execution of the programs stored in the program ROM 102 by the CPU 100.

In this manner, the processing circuit can implement the functions described above by hardware, software, firmware, or a combination thereof.

Next, the operation will be described.

Figure 3:
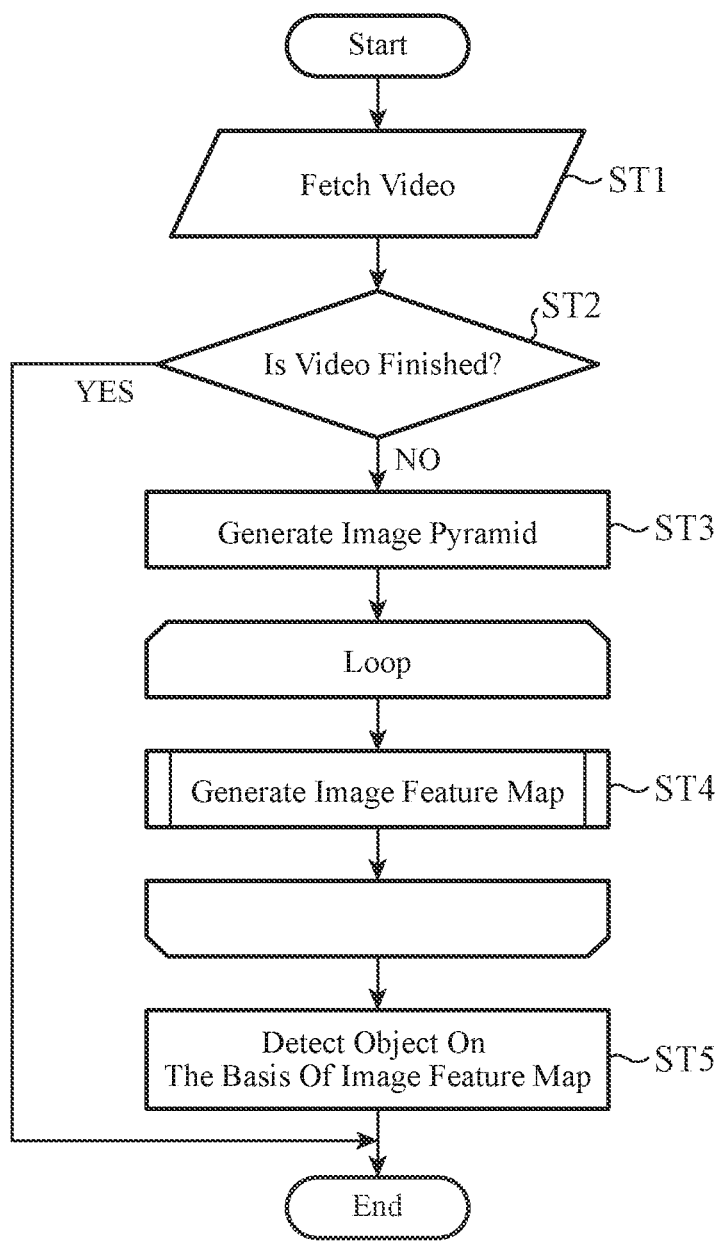
FIG. 3 is a flowchart illustrating the operation of the object detection device according to the first embodiment.

FIG. 3 is a flowchart illustrating the operation of the object detection device 1 and a series of processes until an object is detected.

The video capturing unit 2 fetches video data captured by the camera 109 (step ST1). If the shooting by the camera 109 is finished (step ST2: YES), the series of processes illustrated in FIG. 3 is terminated. That is, fetching of video data by the video capturing unit 2 is continued until the shooting by the camera 109 is completed. For example, in the case where the object detection device 1 is a vehicle detection device using an in-vehicle camera, shooting the outside of the vehicle by the in-vehicle camera is continued while the vehicle is traveling.

When shooting by the camera 109 is not finished (step ST2: NO), the image feature map generating unit 3 receives an image sequence fetched by the video capturing unit 2, reduces a frame image in the image sequence gradually to generate an image pyramid (step ST3). The processing of step ST3 is repeated as many times as the number of frame images in the image sequence.

Next, the image feature map generating unit 3 extracts feature amounts from each of the plurality of images having different image sizes in the image pyramid and generates an image feature map for each of the images (step ST4). The processing of step ST4 is repeated as many times as the number of image pyramids.

The object detecting unit 4 integrates the image feature maps obtained for the respective images in the image pyramid, as an estimation result for one frame image, and detects an object on the basis of a result of the integration (step ST5). The detection result of an object obtained in this manner is output from the object detecting unit 4 to the object recognizing unit 5, and the object recognizing unit 5 recognizes an attribute or the like of the object.

Here, detection of an object based on an image feature map will be described in detail.

Figure 4:
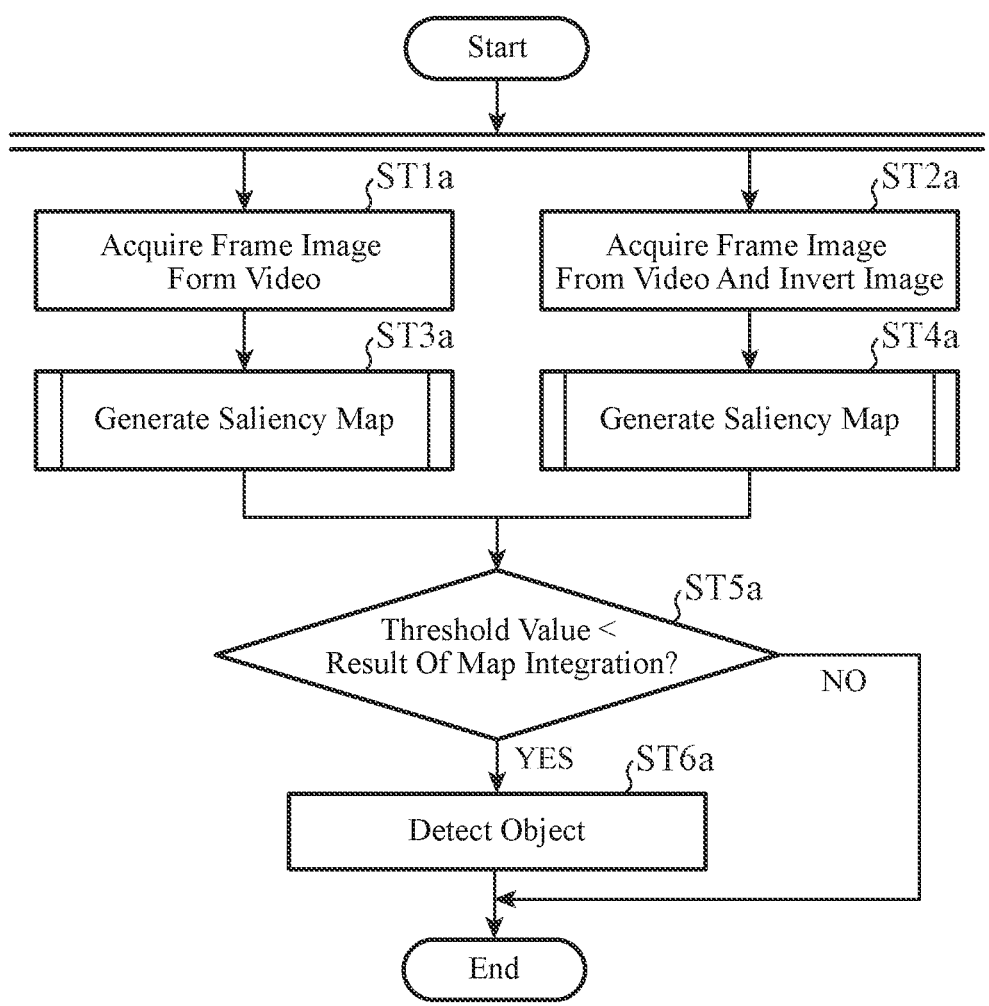
FIG. 4 is a flowchart illustrating a specific example of processing in steps ST4 and ST5 in FIG. 3.

FIG. 4 is a flowchart illustrating a specific example of processing in steps ST4 and ST5 in FIG. 3.

First, the image feature map generating unit 3 acquires a frame image in the image sequence fetched by the video capturing unit 2 (step ST1*a*), and acquires the same frame image from the image sequence and inverts the frame image (step ST2*a*). Here, to invert means to invert the brightness in the frame image. That is, a dark part of the image is converted to a bright part, and a bright part is converted to a dark part.

Next, the image feature map generating unit 3 generates an image pyramid by reducing the acquired frame image gradually, and further generates an image pyramid by reducing the inverted frame image gradually. Subsequently, the image feature map generating unit 3 generates a saliency map from the image pyramid of the frame image not inverted (step ST3*a*), and generates a saliency map from the image pyramid of the inverted frame image (Step ST4*a*).

Here, a saliency map is a map representing a salient region that is different from its surrounding region on an image. The above salient region is a region at which humans are likely to gaze on the image on the basis of a human visual model. Here, the salient region corresponds to the estimated distribution of object likelihood, and the saliency map is a specific example of the image feature map.

Next, the object detecting unit 4 integrates saliency maps obtained for the respective images in the image pyramid, as an estimation result on one frame image. This processing is performed both on the saliency maps obtained from the image pyramid for the frame image not inverted and the saliency maps obtained from the image pyramid for the inverted frame image, which are further integrated.

Subsequently, the object detecting unit 4 compares image features of the saliency map with a threshold value related to an image feature to determine whether there is a region having a feature amount larger than the threshold value (step ST5*a*).

Here, if there is no region having a feature amount larger than the threshold value in the saliency map (step ST5*a*: NO), it is determined that no object has been detected, and the processing is terminated.

If there is a region having a feature amount larger than the threshold value in the saliency map (step ST5*a*: YES), the object detecting unit 4 detects this region as a region having a detection target object therein (step ST6*a*). Thereafter, the object detecting unit 4 groups the regions extracted in the above manner, and outputs them to the object recognizing unit 5 as a detection region of the object.

Here, the aforementioned generation processing of the saliency map will be described in detail.

Figure 5:
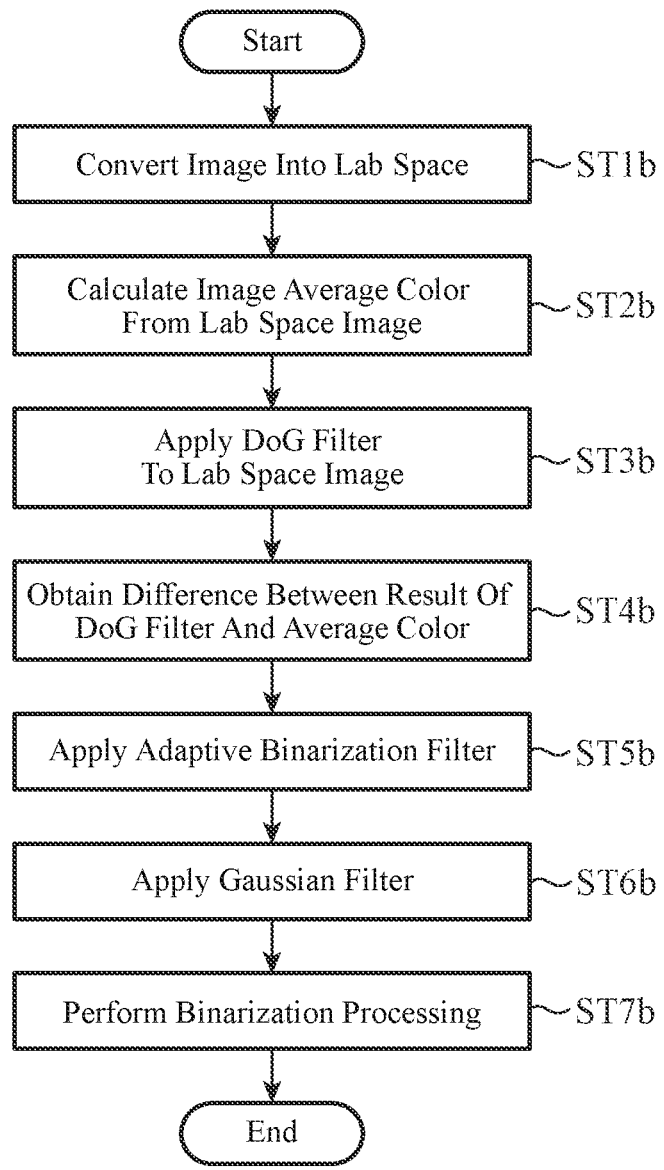
FIG. 5 is a flowchart illustrating generation processing of a saliency map.

FIG. 5 is a flowchart illustrating generation processing of a saliency map.

First, the image feature map generating unit 3 converts an image to be processed into a Lab space designed by approximation to perception levels of colors by humans (step ST1*b*).

Subsequently, the image feature map generating unit 3 calculates an average color of the image converted into the Lab space (step ST2*b*). This average color is a representative color of this image.

Next, the image feature map generating unit 3 applies a difference of Gaussian (DoG) filter to the image converted into the Lab space (step ST3*b*). As a result, Gaussian filters having different scales in the DoG filter are applied to each pixel value of the image, and differences therebetween are obtained.

In the human perception system, retinal cells are known to perceive light intensity and edge directivity from the difference between the center and its surroundings. The DoG filter imitates such operation of retinal cells by image processing.

Out of the Gaussian filters in the DoG filter, application of the one with a smaller scale results in an image having a high resolution, and application of the one with a larger scale results in a blurred image having a low resolution. Utilizing differences in corresponding pixel values between both images means to utilize differences in pixel values between a pixel of interest and its surrounding pixels, which makes it possible to obtain a pixel having a larger change as compared to the surrounding pixels.

Subsequently, the image feature map generating unit 3 calculates a difference between the color of the image to which the DoG filter is applied and the average color calculated in step ST2*b* (step ST4*b*). As a result, a salient region having a large deviation width from the average color is left, thereby enabling removal of the representative color of the peripheral region of this region. In this manner, in step ST4*b* an overall salient part is obtained for the entire image.

Note that it suffices to obtain images having different resolutions in the processing of the DoG filter described above, and thus without being limited to the Gaussian filter, it is also possible to perform processing of resizing an image to images having different sizes and then restoring them to images having the original size.

Next, the image feature map generating unit 3 applies an adaptive binarization filter to the image processed in step ST4b (step ST5b). By the adaptive binarization filter, it is not that the entire image is binarized by using a threshold value, but by using a threshold value determined for each of the pixels in the image, a corresponding one of the pixels is filtered. As a result, each of the pixels in the image is compared with the corresponding threshold value for each of the pixels, and a pixel whose pixel value is larger than the corresponding threshold value is extracted.

Note that the threshold value for each pixel is determined on the basis of brightness information in the vicinity of the target pixel. In the case where the vicinity of the target pixel is bright, a high threshold value is set, and in the case where the vicinity of the target pixel is dark, a low threshold value is set.

Next, the image feature map generating unit 3 applies a Gaussian filter to a group of salient pixels extracted in step ST5b, thereby obtaining a region of the group of salient pixels as a map (step ST6b). Then, the image feature map generating unit 3 binarizes the map (step ST7b). The object detecting unit 4 detects an object on the basis of the map binarized in this manner.

Note that, in step ST5b, more local salient pixels are obtained by narrowing down the salient part obtained in step ST4b. This enables identification of an edge component that is robust to a local brightness change contained in pixels and has a pattern different from those of the surroundings.

In addition, since in FIG. 4 the image not inverted in step ST1a is used as well as the image inverted in step ST2a, it is possible to extract, in similar manners, a dark salient point in the case where the surrounding region of the pixel of interest is bright as well as a bright salient point in the case where the surrounding region of the pixel of interest is dark.

As described above, the object detection device 1 according to the first embodiment includes the image feature map generating unit 3 and the object detecting unit 4. In this configuration, the image feature map generating unit 3 generates, on the basis of feature amounts extracted from a plurality of images successively captured by the camera 109, an image feature map representing an estimated distribution of the object likelihood on each of the images. The object detecting unit 4 detects an object on the basis of the image feature map generated by the image feature map generating unit 3.

With this configuration, since the object is detected on the basis of the estimated distribution of object likelihood on the corresponding image, the object can be accurately detected within a range from the vicinity of the camera 109 to a distant location, the range being captured by the camera 109.

Since the object detection device 1 detects a region of an object that is noticeable by human eyes in an image, it is effective in detection of signs, individuals, defects, or vehicles, for example.

In many cases, characters on signs are written in a color different from that of the background part in order to enhance visibility. Therefore, the character part is easily detected by the object detection device 1 as a salient region different from the background part.

Moreover, the object detection device 1 does not detect a pattern (texture) of the background, but detects a salient region different from the surroundings. Therefore, in detection of individuals, unless clothing of an individual blends into the background, the clothing of the individual is detected as a salient region different from the background.

Furthermore, by using the object detection device 1, for example it is possible to detect parts on a conveyor line in a factory to measure the number of the parts, and to discriminate results of forming the parts from shapes of the parts recognized by the object recognizing unit 5.

In the case of detecting cracks or the like of a structure, in the related art a repair mark of the structure or the original pattern or the like of the structure is also detected, and thus processing of distinguishing these from cracks is necessary.

In contrast, in the object detection device 1, since a pattern included in the background is not detected, cracks of a structure can be easily detected.

Furthermore, the object detection device 1 is capable of detecting other vehicles on the basis of video data from an in-vehicle camera such as a camera used in a drive recorder. In this case, a region of an object having a color and a shape different from those of the background region in the image is detected as a region of a vehicle.

Second Embodiment

Figure 6:
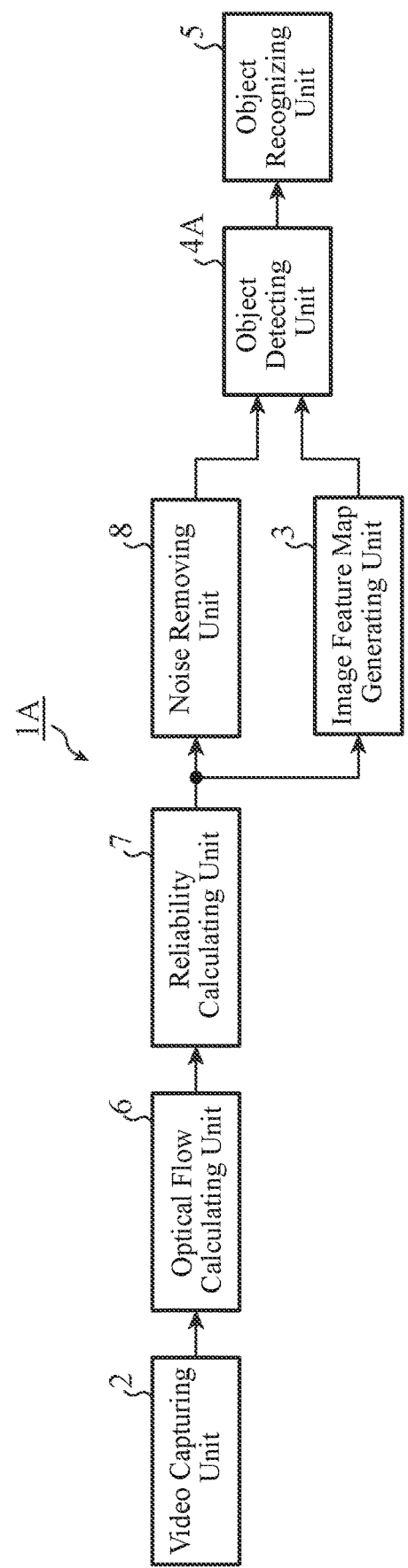
FIG. 6 is a block diagram illustrating a functional configuration of an object detection device according to a second embodiment of the present invention.

FIG. 6 is a block diagram illustrating a functional configuration of an object detection device 1A according to a second embodiment of the present invention. In FIG. 6, the same components as those in FIG. 1 are denoted with the same symbols and descriptions thereof are omitted.

In the object detection device 1A, object detection based on optical flows and object detection based on an image feature map are performed depending on the reliability of the optical flows.

As illustrated in FIG. 6, the object detection device 1A includes a video capturing unit 2, an image feature map generating unit 3, an object detecting unit 4A, an object recognizing unit 5, an optical flow calculating unit 6, a reliability calculating unit 7, and a noise removing unit 8.

The optical flow calculating unit 6 calculates optical flows between frame images of video data captured by a camera.

An optical flow is information in which the amount of movement of the same object associated between frame images is represented by a vector, which is calculated for each pixel.

Note that, in optical flows, not only movement information in the time direction of an object but also spatial continuity is considered, which enables vector notation reflecting the shape of the object as a feature.

The reliability calculating unit 7 calculates the reliability of the optical flows. For example, the magnitude of a vector indicating the amount of movement of the object between the frame images, that is, a scalar value is calculated as the reliability. An object located far from the camera has a smaller scalar value because an apparent motion on an image captured by the camera is small.

The noise removing unit 8 removes optical flows in a direction along a moving direction of the camera out of the optical flows, as noise. For example, in a case where a camera is mounted on a vehicle, optical flows obtained from images captured by the camera are predominantly those observed in a traveling direction of the vehicle. The optical flows in this direction are included in the background region of the object, and optical flows in a direction not equivalent to this direction can be considered to be included in the foreground, that is, a region in which the object is present.

Therefore, the noise removing unit 8 removes the optical flows included in this background region.

The object detecting unit 4A performs object detection based on optical flows and object detection based on an image feature map depending on the reliability of the optical flows. For example, out of regions on an image captured by the camera, the object detecting unit 4A performs object detection based on optical flows in a region in which scalar values of the optical flows are higher than a threshold value, and in a region in which scalar values are less than or equal to the threshold value, performs object detection based on an image feature map.

Note that, as described earlier, the object detection based on optical flows is to detect an object on the basis of differences between optical flows of a screen assumed in a standard environment in which no object is present and optical flows based on a video actually captured by the camera.

The object detection based on an image feature map is as described in the first embodiment.

Although in FIG. 6 the case where the object detection device 1A includes the video capturing unit 2 has been described, the video capturing unit 2 may be included in the camera itself.

Moreover, the object recognizing unit 5 may not be included in the object detection device 1A but may be included in an external device connected subsequently to the object detection device 1A.

Furthermore, the noise removing unit 8 may be one of functions of the object detecting unit 4A.

That is, the object detection device 1A is only required to include at least the image feature map generating unit 3, the object detecting unit 4A, the optical flow calculating unit 6, and the reliability calculating unit 7.

Figure 7:
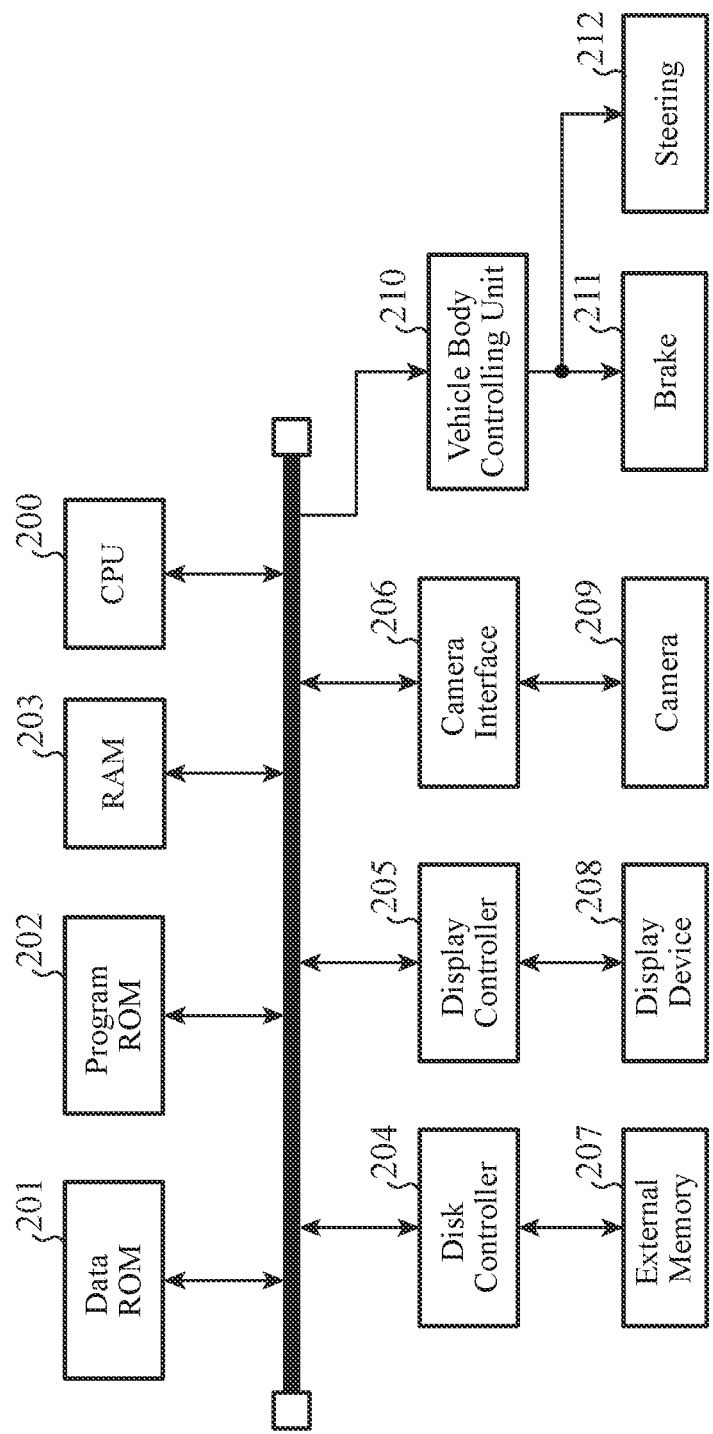
FIG. 7 is a block diagram illustrating a hardware configuration of the object detection device according to the second embodiment.

FIG. 7 is a block diagram illustrating a hardware configuration of the object detection device 1A.

In FIG. 7, the video capturing unit 2 illustrated in FIG. 6 fetches an image sequence captured by a camera 209 via a camera interface 206 and stores the image sequence in a data ROM 201.

The optical flow calculating unit 6 illustrated in FIG. 6 develops the image sequence stored in the data ROM 201 in a RAM 203 and calculates a motion vector of an object between frame images for each pixel. The reliability calculating unit 7 illustrated in FIG. 6 calculates an absolute value (scalar value) of the vector which is an optical flow developed in the RAM 203.

For each of the images developed in the RAM 203, the noise removing unit 8 illustrated in FIG. 6 removes optical flows included in the background region, and holds optical flows included in a region of an object that is the foreground in the RAM 203. Note that in the RAM 203 a plurality of optical flows included in the region of the object is held in a time series, and thus it is guaranteed that the direction of the optical flows is stable.

The image feature map generating unit 3 illustrated in FIG. 6 generates image feature maps using the image sequence stored in the data ROM 201 and stores the generated image feature maps in the RAM 203.

The object detecting unit 4A illustrated in FIG. 6 performs object detection based on the optical flows stored in the RAM 203 and object detection based on the image feature maps.

Moreover, the object recognizing unit 5 illustrated in FIG. 6 recognizes an attribute of an object detected by the object detecting unit 4A. An attribute of an object includes, for example, a type such as a vehicle, an individual, or a two-wheeler.

Note that the detection result of the object is either stored in an external memory 207 via a disk controller 204 or displayed on a display device 208 via a display controller 205.

The detection result of the object by the object detecting unit 4A and the recognition result of the object by the object recognizing unit 5 are output to a vehicle body controlling unit 210. Here, the vehicle body controlling unit 210 is a device provided subsequently to the object recognizing unit 5 in FIG. 6 and controls a brake 211 and a steering 212.

For example, when avoiding a collision between the object detected by the object detection device 1A and the vehicle, the vehicle body controlling unit 210 controls the brake 211 and the steering 212 to perform driving operation for avoiding the collision. Furthermore, the vehicle body controlling unit 210 determines the optimum driving behavior in relation between the object and the vehicle from the attribute of the object recognized by the object recognizing unit 5 and controls the brake 211 and the steering 212 to perform the driving behavior.

Note that the disk controller 204, the display controller 205, the camera interface 206, the external memory 207, the display device 208, and the camera 209 may not be included in the object detection device 1A. That is, these devices may be provided separately from the object detection device 1A, and may be included in an external device capable of receiving and outputting data from and to the object detection device 1A.

Note that the functions of the image feature map generating unit 3, the object detecting unit 4A, the optical flow calculating unit 6, and the reliability calculating unit 7 in the object detection device 1A are implemented by a processing circuit.

That is, the object detection device 1A includes a processing circuit for performing operations of the functions described above. The processing circuit may be dedicated hardware or a CPU 200 that executes a program stored in a program ROM 202.

In the case where the processing circuit is hardware, the processing circuit corresponds to, for example, a single circuit, a composite circuit, a programmed processor, a parallel programmed processor, an ASIC, an FPGA, or a combination thereof.

In addition, each of the functions of the image feature map generating unit 3, the object detecting unit 4A, the optical flow calculating unit 6, and the reliability calculating unit 7 may be implemented by a processing circuit, or the functions may be implemented by a single processing circuit in an integrated manner.

In the case where the processing circuit is a CPU 200, the functions of the image feature map generating unit 3, the object detecting unit 4A, the optical flow calculating unit 6, and the reliability calculating unit 7 are implemented by software, firmware, or a combination of software and firmware.

The software and the firmware are described as programs and stored in the program ROM 202. The CPU 200 reads and executes the programs stored in the program ROM 202 and thereby implements the functions. In other words, the object detection device 1A includes a memory for storing programs which result in execution of operations of the functions. These programs also cause a computer to execute a procedure or a method of each of the image feature map generating unit 3, the object detecting unit 4A, the optical flow calculating unit 6, and the reliability calculating unit 7.

Like in the first embodiment, the memory may be, for example, a nonvolatile or volatile semiconductor memory such as a RAM, a ROM, a flash memory, an EPROM, or an EEPROM, a magnetic disk, a flexible disk, an optical disk, a compact disk, a mini disk, a DVD, or the like.

Furthermore, some of the functions of the image feature map generating unit 3, the object detecting unit 4A, the optical flow calculating unit 6, and the reliability calculating unit 7 may be implemented by dedicated hardware, and the others may be implemented by software or firmware. For example, the function of the image feature map generating unit 3 is implemented by a dedicated hardware processing circuit while the functions of the object detecting unit 4A, the optical flow calculating unit 6, and the reliability calculating unit 7 are implemented by execution of the programs stored in the program ROM 202 by the CPU 200. In this manner, the processing circuit can implement the functions described above by hardware, software, firmware, or a combination thereof.

Next, the operation will be described.

Figure 8:
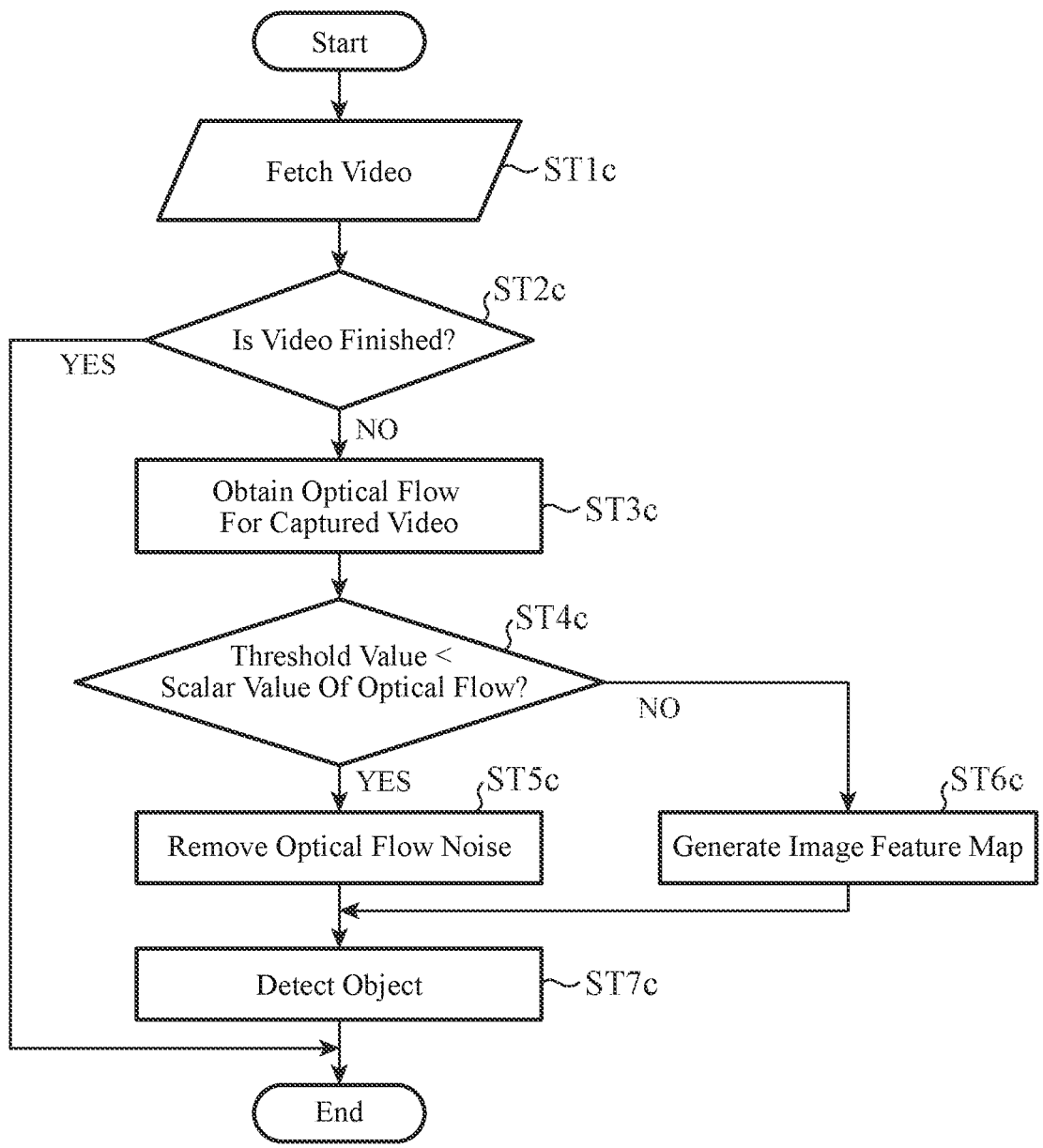
FIG. 8 is a flowchart illustrating the operation of the object detection device according to the second embodiment.

FIG. 8 is a flowchart illustrating the operation of the object detection device 1A and a series of processes until an object is detected.

First, the video capturing unit 2 fetches video data captured by the camera 209 (step ST1c). Here, it is assumed that the camera 209 is in a mobile state. This state means, for example, that the camera 209 is an in-vehicle camera and that the camera 209 can move together with the vehicle. Note that the camera 209 may not be moving while capturing a video.

If the shooting by the camera 209 is finished (step ST2c: YES), the series of processes illustrated in FIG. 8 is terminated. That is, fetching of video data by the video capturing unit 2 is continued until the shooting by the camera 209 is completed.

If shooting by the camera 209 is not finished (step ST2c: NO), the optical flow calculating unit 6 calculates an optical flow for each pixel between frame images in an image sequence fetched by the video capturing unit 2 (step ST3c). For example, dense optical flows are calculated.

Next, the reliability calculating unit 7 calculates a scalar value of an optical flow as reliability.

An object located far from the camera 209 has a smaller scalar value since an apparent motion on an image captured by the camera 209 is small. In addition, a scalar value of an optical flow calculated from an object moving at an equal speed with the vehicle provided with the camera 209 is very small.

The reliability calculating unit 7 compares the scalar value of the optical flow with a threshold value and thereby determines whether the scalar value is larger than the threshold value (step ST4c).

As the threshold value, by a discrimination analysis method using absolute values of motion vectors of optical flows, a value is adaptively determined that makes it possible to appropriately separate regions on the image into a region in which a moving body is present and the other regions.

If the scalar value is larger than the threshold value (step ST4c: YES), the reliability calculating unit 7 determines that among regions in the image, the reliability of optical flows in a region from which the optical flow of this scalar value has been obtained is high. This determination result is notified from the reliability calculating unit 7 to the noise removing unit 8. Upon receiving this notification, from the optical flows in the region having the high reliability of the optical flows, the noise removing unit 8 removes optical flows of the background region, as noise (step ST5c).

On the other hand, if the scalar value is less than or equal to the threshold value (step ST4c: NO), the reliability calculating unit 7 determines that among regions in the image, the reliability of optical flows in a region from which the optical flow of this scalar value has been obtained is low. The determination result is notified from the reliability calculating unit 7 to the image feature map generating unit 3. The image feature map generating unit 3 generates an image feature map in a similar manner to the processing in FIG. 4 and FIG. 5 described in the first embodiment (step ST6c)

Out of regions on the image, the object detecting unit 4A performs, in a region in which the reliability of optical flows is high, object detection based on optical flows, and, in a region in which the reliability of optical flows is low, performs object detection based on an image feature map (step ST7c).

The detection result of an object obtained in this manner is output from the object detecting unit 4A to the object recognizing unit 5, and the object recognizing unit 5 recognizes an attribute or the like of the object.

Here, the noise removal processing by the noise removing unit 8 will be described in detail.

Figure 9:
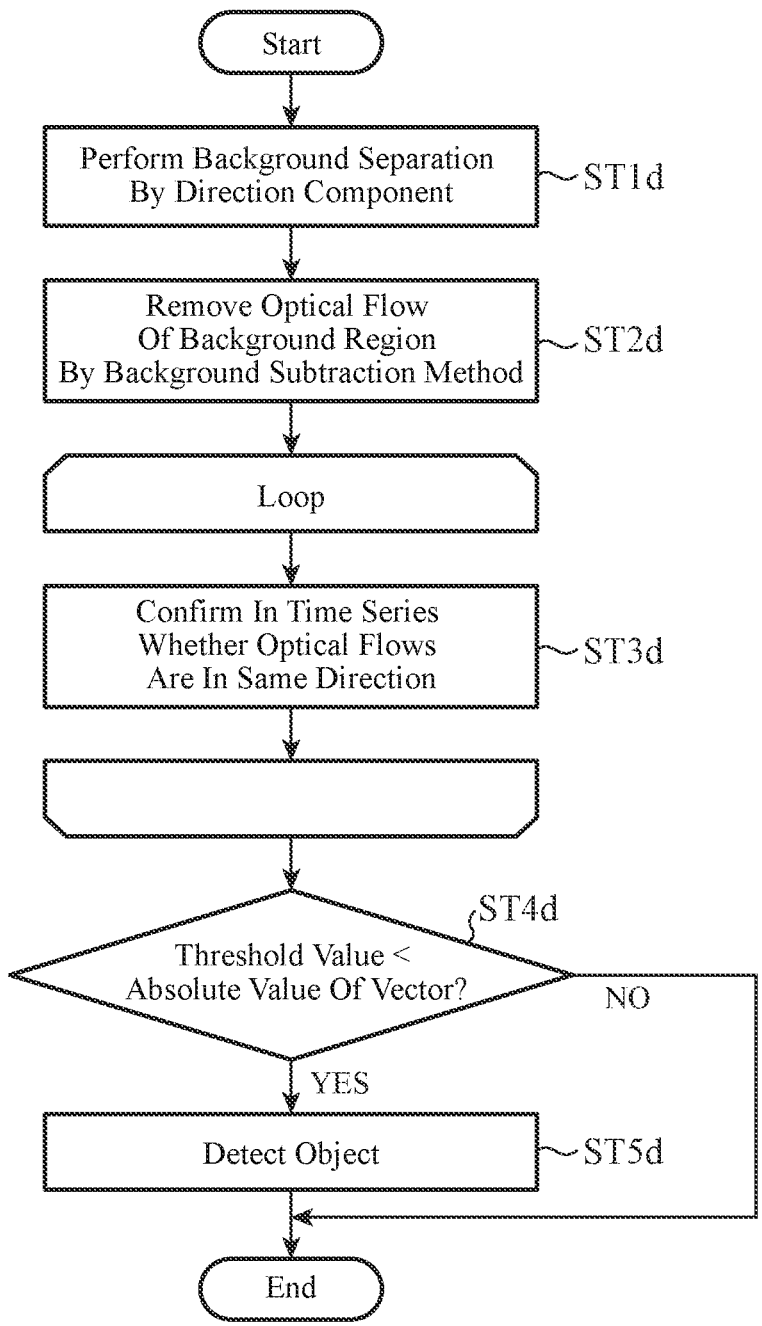
FIG. 9 is a flowchart illustrating a specific example of processing in steps ST5c and ST7c in FIG. 8.

FIG. 9 is a flowchart illustrating a specific example of processing in steps ST5c and ST7c in FIG. 8.

First, the noise removing unit 8 separates a background region in an image on the basis of direction components of optical flows (step ST1d).

For example, by using the k-means method, the noise removing unit 8 separates a frame image into a region including optical flows in the dominant direction and a region including optical flows in a direction not equivalent thereto. In this embodiment, a region including optical flows in the dominant direction is regarded as the background region, and a region including optical flows in a direction not equivalent to the dominant direction is regarded as the foreground region.

Next, the noise removing unit 8 removes optical flows included in the background region (step ST2d). For example, the noise removing unit 8 removes the optical flows included in the background region on the basis of a dynamic background subtraction method extended in a time series. Note that the dynamic background subtraction method is a method for obtaining the foreground region that is not included in the background region by dynamically generating and updating a background model from frame images aligned in a time series.

The object detecting unit 4A confirms in a time series whether the optical flows included in the frame image from which the noise has been removed by the noise removing unit 8 are stably oriented in the same direction (step ST3d). For example, the object detecting unit 4A estimates the position of the foreground region in a next frame image, by utilizing the direction of the optical flows from a frame image which is the preceding frame image and from which the noise of the background region has been removed. By putting this estimation result and the actual next frame image together, the region in which the object is present is estimated in a time series. The object detecting unit 4A performs this correction processing for a predetermined number of repetitions.

Next, the object detecting unit 4A determines whether an absolute value of a vector of an optical flow in the foreground region, in which the time series position data has been corrected in step ST3*d*, is larger than a threshold value (step ST4*d*). Here, if the absolute value of the vector is less than or equal to the threshold value (step ST4*d*: NO), the object detecting unit 4A determines that the foreground region is not a region of a moving body and terminates the processing.

On the other hand, if the absolute value of the vector is larger than the threshold value (step ST4*d*: YES), the object detecting unit 4A detects the foreground region as a region in which a moving body is present (step ST5*d*).

Thereafter, the object detecting unit 4A groups the regions extracted in the above manner and outputs them, as a detection region of the moving body, to the object recognizing unit 5.

Figure 10:
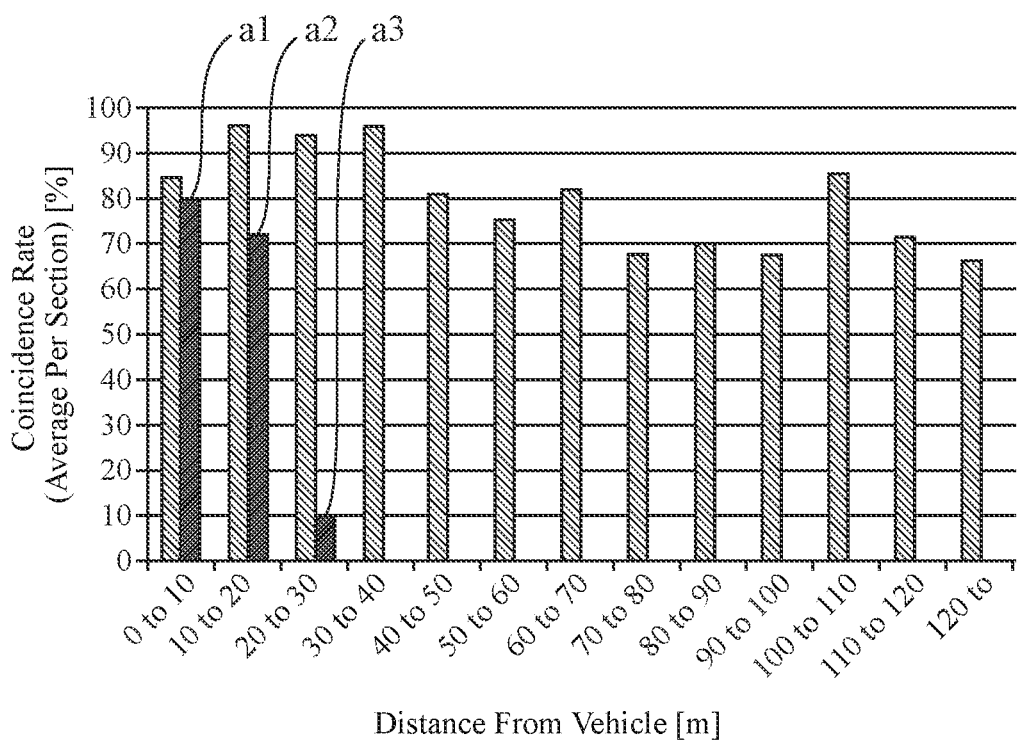
FIG. 10 is a graph illustrating a relationship between the distance from a vehicle to a moving body and the coincidence rate.

FIG. 10 is a graph illustrating a relationship between the distance from a vehicle to a moving body and the coincidence rate. In FIG. 10, the horizontal axis represents the distance from the vehicle to the moving body, and the vertical axis represents the coincidence rate between the correct position of the moving body and the position of a detection result.

Results denoted by symbols a1 to a3 are those of a conventional object detection device described in the following Reference Literature 1, and the other results are those of the object detection device 1A.

(Reference Literature 1) Norio Hashiguchi, Masatoshi Touno, Daisuke Ueno, Yasuhiko Nakano, "Sensing Technology Supporting Convergence Service", FUJITSU Technical Report, Vol. 64, pp. 74-80, 2013.

Because the object detection device described in the above reference literature largely depends on a calculation result of optical flows, as illustrated by symbols a1 to a3, the object detection device can only detect an object in the vicinity of a vehicle and cannot cope with an object that is far from the vehicle.

On the other hand, because the object detection device 1A detects a distant object on the basis of a saliency map not dependent on the movement of an object, it is possible to stably detect even an object 100 m or more away from the vehicle.

Note that, when the video data fetched by the video capturing unit 2 is compressed, the optical flow calculating unit 6 may calculate an optical flow using the compressed information.

Among compression methods, there is a method for performing motion prediction of video data by using preceding and succeeding frame images, and using this method enables extraction of a motion region having a similar gradient direction for each block. By using this motion information, only a moving object can be extracted. In this case, since the motion information is included in the compressed video data, there is no need to analyze the video to newly calculate optical flows. As a result, the calculation load can be reduced.

As described above, the object detection device 1A according to the second embodiment includes the optical flow calculating unit 6 and the reliability calculating unit 7 in addition to the configuration of the object detection device 1 according to the first embodiment.

In this configuration, the object detecting unit 4A performs object detection based on optical flows and object detection based on an image feature map depending on the reliability calculated by the reliability calculating unit 7. For example, in the case where an object is far from the camera 209, the reliability of the optical flows is low and object detection based on an image feature map is performed, and in the case where an object is in the vicinity of the camera 209, the reliability is high and object detection based on optical flows is performed.

As a result, the object can be accurately detected within a range from the vicinity of the camera 209 to a distant location.

Furthermore, the object detection device 1A according to the second embodiment includes the noise removing unit 8. Out of regions on an image, the object detecting unit 4A determines a region in which an optical flow in a direction not equivalent to that of an optical flow removed by the noise removing unit 8 is obtained, as a region in which an object is present.

With this configuration, the region in which the object is present can be detected accurately.

Note that, within the scope of the present invention, the present invention may include a flexible combination of the embodiments, a modification of any component of the embodiments, or omission of any component in the embodiments.

INDUSTRIAL APPLICABILITY

Since the object detection device according to the present invention is capable of accurately detecting an object within a range from the vicinity of a camera to a distant location, the object detection device is suitable for detection of a vehicle, an individual, and the like, for example.

REFERENCE SIGNS LIST 1, 1A: Object detection device, 2: Video capturing unit, 3: Image feature map generating unit, 4, 4A: Object detecting unit, 5: Object recognizing unit, 6: Optical flow calculating unit, 7: Reliability calculating unit, 8: Noise removing unit, 100, 200: CPU, 101, 201: Data ROM, 102, 202: Program ROM, 103, 203: RAM, 104, 204: Disk controller, 105, 205: Display controller, 106, 206: Camera interface, 107, 207: External memory, 108, 208: Display device, 109, 209: Camera, 210: Vehicle body controlling unit, 211: Brake, 212: Steering.

The invention claimed is:

1. An object detection device, comprising:
a processor to execute a program; and
a memory to store the program which, when executed by the processor, performs processes of,
acquiring, from a plurality of frame images arranged in a time series in an image sequence successively captured by a camera, a pair of same frame images for each of the plurality of frame images and inverting one of the same frame images, generating image pyramids each of which includes images obtained by gradually reducing a corresponding one of the same frame images of the pair, extracting, from an image of a salient part extracted from each of the images in each of the image pyramids, a group of pixels each of whose pixel value is larger than a corresponding threshold value, the threshold value being set for each of the pixels depending on brightness information in a vicinity of a target pixel, generating a map by integrating the extracted group of pixels, binarizing and then integrating the map generated for each of the images in each of the image pyramids which correspond to the same frame images of the pair, and thereby generating, for each of the plurality of frame images, an image feature map representing an estimated distribution of object likelihood on a corresponding one of the plurality of frame images; and
detecting an object on a basis of the image feature map generated.

2. The object detection device according to claim 1, the processes further comprising:
calculating optical flows between the plurality of frame images captured successively by the camera; and
calculating reliability of the optical flows calculated,
wherein object detection based on at least one of the optical flows and object detection based on the image feature map are performed depending on the reliability calculated.

3. The object detection device according to claim 2, wherein, out of regions on each of the plurality of frame images, in a region in which reliability of a first optical flow is higher than a threshold value, object detection based on the first optical flow is performed, and in a region in which reliability of a second optical flow is less than or equal to the threshold value, object detection based on the image feature map is performed, the first and second optical flows being included in the optical flows.

4. The object detection device according to claim 2, the processes further comprising:
removing, out of the optical flows, an optical flow in a direction along a moving direction of the camera, as an optical flow included in a background region of the object,
wherein, out of regions on each of the plurality of frame images, a region in which a third optical flow in a direction not equivalent to that of the optical flow removed has been obtained is determined, as a region in which the object is present, the third optical flow being included in the optical flows.

5. An object detection method comprising:
acquiring, from a plurality of frame images arranged in a time series in an image sequence successively captured by a camera, a pair of same frame images for each of the plurality of frame images and inverting one of the same frame images, generating image pyramids each of which includes images obtained by gradually reducing a corresponding one of the same frame images of the pair, extracting, from an image of a salient part extracted from each of the images in each of the image pyramids, a group of pixels each of whose pixel value is larger than a corresponding threshold value, the threshold value being set for each of the pixels depending on brightness information in a vicinity of a target pixel, generating a map by integrating the extracted group of pixels, binarizing and then integrating the map generated for each of the images in each of the image pyramids which correspond to the same frame images of the pair, and thereby generating, for each of the plurality of frame images, an image feature map representing an estimated distribution of object likelihood on a corresponding one of the plurality of frame images;
calculating optical flows between the plurality of frame images captured successively by the camera;
calculating reliability of the optical flows calculated; and
performing object detection based on at least one of the optical flows and object detection based on the image feature map depending on the reliability calculated.

* * * * *